United States Patent [19]

Silver et al.

[11] 4,345,109
[45] Aug. 17, 1982

[54] RESTRAINT APPARATUS FOR PIPE TYPE ELECTRIC CABLES

[75] Inventors: David A. Silver, Livingston; Attila F. Dima, Piscataway; George W. Seman, Piscataway, all of N.J.

[73] Assignee: Pirelli Cable Corporation, Union, N.J.

[21] Appl. No.: 203,253

[22] Filed: Nov. 3, 1980

[51] Int. Cl.³ .............................................. H02G 15/18
[52] U.S. Cl. ................................. 174/84 R; 174/21 R
[58] Field of Search ................. 174/70 R, 79, 84 R, 174/88 R, 21 R, 68 R; 285/114

[56] References Cited
U.S. PATENT DOCUMENTS 2,058,929 10/1936 Vietzen ........................... 174/21 R
2,099,291 11/1937 Bennett .......................... 174/21 R
2,306,331 12/1942 Elmer ............................. 174/70 R
4,039,745 8/1977 Waldron .

Primary Examiner—Roy N. Envall, Jr.
Attorney, Agent, or Firm—Brooks Haidt Haffner & Delahunty

[57] ABSTRACT

In a pipe type electric cable installation in which portions of the cable cores extend into a joint casing where the conductors of the cores are conductively joined, the portions of the cores within the casing are enclosed by tubes which are longitudinally curved, preferably, S-shaped, to restrict axial movement of the cores with varying load conditions, one end of each tube being anchored, at least with respect to longitudinal movement, to the casing.

13 Claims, 6 Drawing Figures

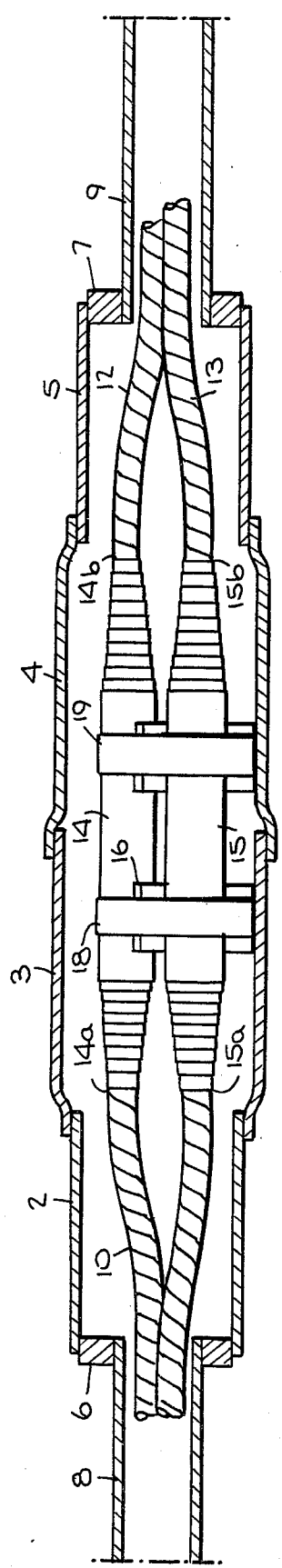
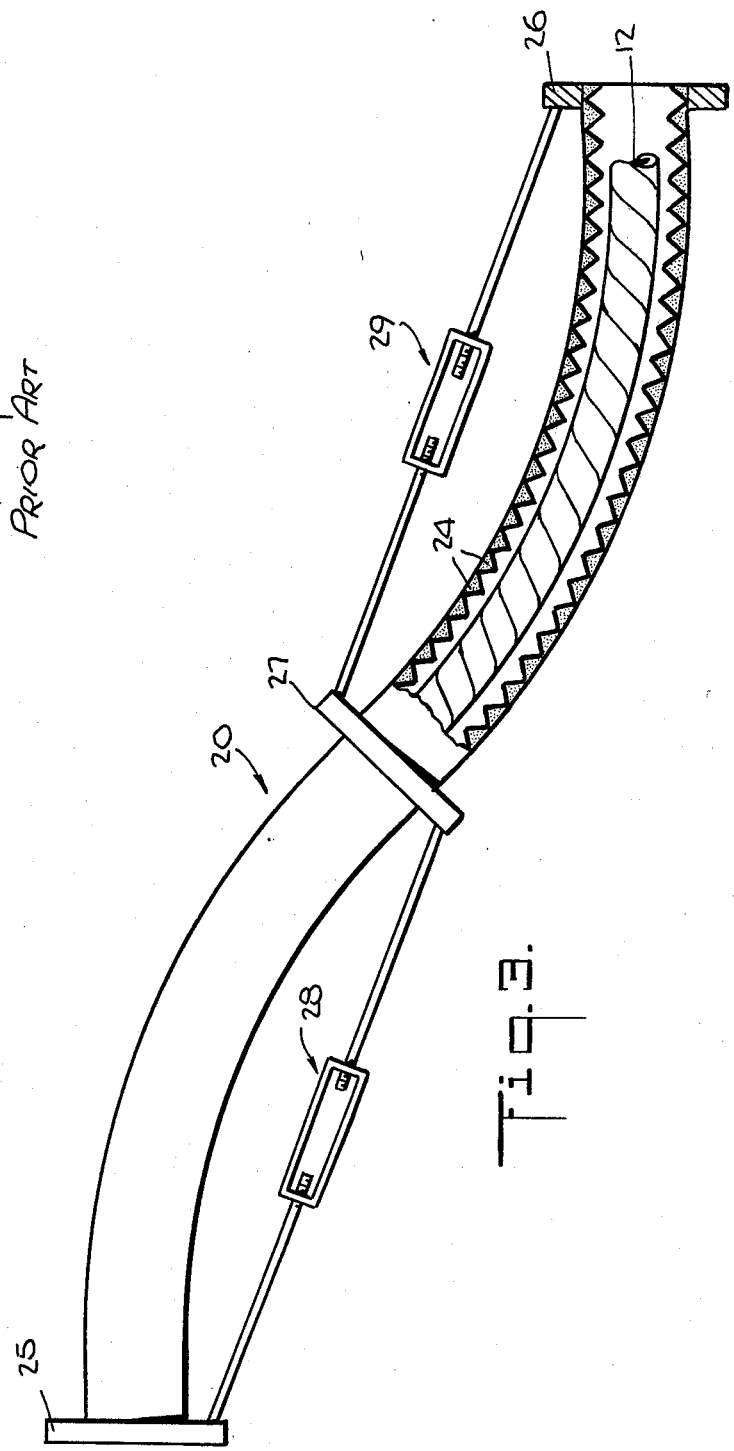
Fig.1. PRIOR ART
Fig.3.

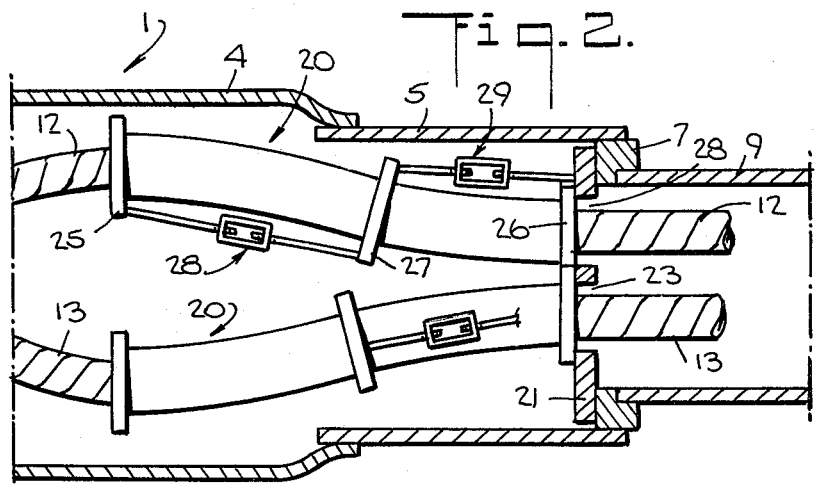
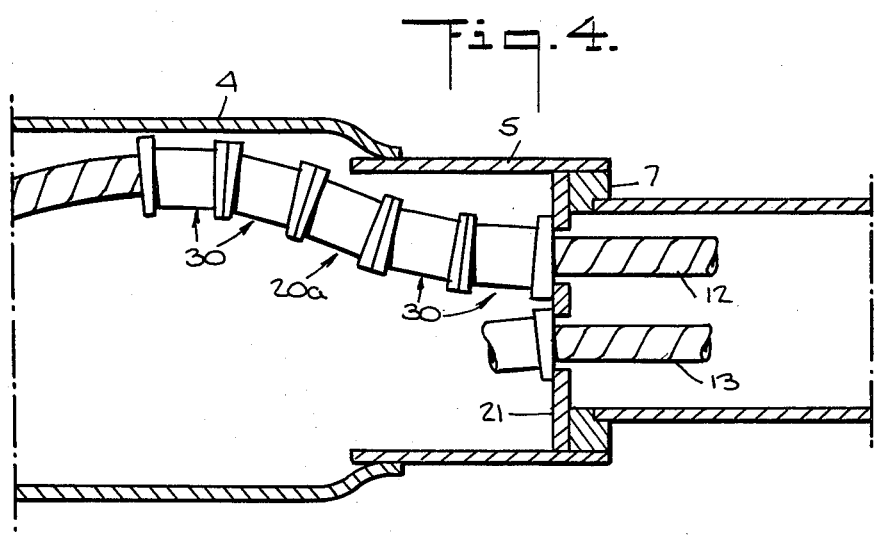
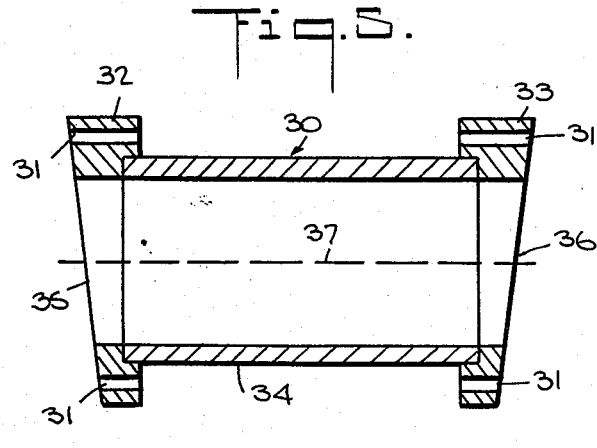
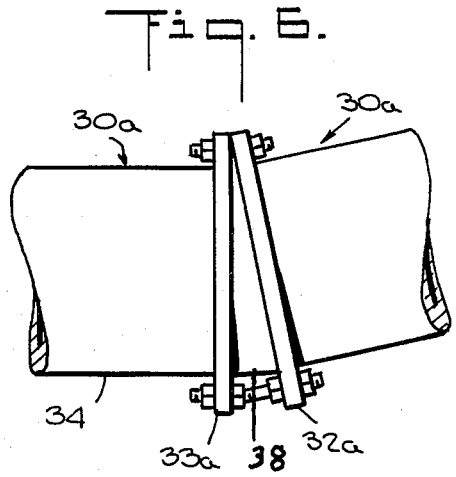

RESTRAINT APPARATUS FOR PIPE TYPE ELECTRIC CABLES

This invention relates to restraining apparatus for electric cables which are used for the transmission of electrical energy and which are subject to expansion and contraction forces which vary with load and particularly, to cable systems, known as pipe type cables, which comprise one or more insulated conductors within a metal pipe.

Pipe type cables are known in the art and are employed for transmission of electrical energy at voltage levels of from 35 kV to 550 kV. Certain known types of such cables comprise three oil impregnated paper insulated copper or aluminum conductor cables installed in a steel pipe usually buried in the earth. D-shaped metallic wires, termed skid wires, are applied over the shielded insulation structure to facilitate pulling the three cables into the steel pipe. The pipe, which is fluid-tight, is then filled with oil or nitrogen gas which is pressurized at a nominal value of 200 psig. Such cables are termed, respectively, high pressure oil filled (HPOF) or high pressure gas filled (HPGF) pipe type cables.

The steel pipe is normally installed in lengths of 40 to 50 feet. The sections are welded together during installation to form continuous lengths of 2000 to 4000 feet for land installations. The inside diameter of the steel pipe is such as to facilitate pulling the cables into the 2000 to 4000 foot lengths of the steel pipe and usually is large enough so that the diameter over the skid wire of one insulated conductor is normally 32 to 42 percent of the inside diameter of the steel pipe. The nominal clearance between the top cable, with three cables in triangular configuration resting on the bottom of the steel pipe, is normally 1 to 3.5 inches.

The 2000 to 4000 foot lengths of the three cables are joined to successive, essentially equivalent lengths to form the total electrical circuit. Joints in the three cables are contained in a larger inside diameter steel pipe, usually formed from at least three pipe sections which are welded to each other and to the line pipes in which three cables were installed. The larger inside diameter steel pipe is called the joint casing, and the inside diameter of the joint casing ranges between 120 and 180 percent of the diameter of the steel line pipes.

In service, the cables carry electrical currents which vary depending on the daily load cycle of the utility system. The consequent heating and cooling of the cables in the steel pipe causes longitudinal expansion and contraction of the metallic conductors and the cable structures which results in axial movement of the cables which causes bending and twisting of the cables in the steel pipe. This action is termed Thermomechanical Bending (TMB). TMB is a randomly occurring phenomenon and may result in excessive cable bending and twisting at discrete points or nodes in the cable run while tension is created in other sections of the cable. When cables with laminar insulation, such as paper tapes, are repetitively subjected to bending in smaller radii than is permitted by design, a number of paper tapes will be displaced from their original position. The locations at which the tapes are displaced, which corresponds to bending nodes of small radii, are sites for the development of "soft spots" in the insulation structure. The dielectric strength at these soft spots can be less than the electrical stress caused by the operating voltage of the cable, and electrical failure can result.

Depending on the stiffness of the cables, which is mainly a function of conductor size and construction, insulation wall thickness and structure, and the slope of the line pipe, the cable can move into the joint casing. The force generated by expansion of the cable under load cycling can also be sufficient to move the joint against a joint casing wall at an end of the casing. This can result in damage to the joint and can aggravate the problem of thermomechanical bending within the joint casing.

To date, a significant number of cable failures and near failures have been experienced in service on HPOF pipe cable systems due to thermomechanical bending within the joint casing. A number of these cable failures have involved movement of the joints within the joint casing.

Cables within the joint casing are particularly susceptible to TMB failures. This is due to the manner in which the end portions of the cables must be displaced, i.e. double bent into an "S" shape, to provide sufficient axial distance to accommodate the three joints which are larger in diameter than the cables themselves. The length of cable between the casing end walls and the start of the joint stress cone has been the predominant site for development of soft spots in the insulation and consequent cable failure. Complete taping of the three cables and joints together from one end wall of the casing to the other to form a rigid structure can prevent the development of soft spots in this location. However, such taping results in a rigid structure which promotes axial movement of the joints. As a consequence thereof, after a number of load cycles, the axial forces will move the joints against one of the casing end walls causing permanent mechanical damage and electrical failure. In addition, the axial movement causes portions of unbound cable from the line pipe to move into the joint casing. Thus, unbound cables are exposed to TMB and electrical failure.

One object of the invention is to eliminate, or substantially reduce, electrical failure of pipe type cables which is due to thermomechanical bending.

A further object of the invention is to reduce thermomechanical bending of cables without damaging the insulation thereon as would be the case when clamping of the cables is employed.

In accordance with the invention, a portion of a cable within a joint casing is held in a curved shape by an enclosing tube of such shape which is secured, at least at one end, in a fixed position with respect to the casing. Preferably, the enclosing tube is S-shaped and is secured at its end to an end wall of the joint casing. The curvature of the enclosing tube in conjunction with the inherent stiffness of a cable applies forces to the cable which, under normal conditions, prevent, or restrict, axial movement of a cable in a manner which eliminates, or substantially reduces the thermomechanical bending described hereinbefore.

Other objects and advantages of the present invention will be apparent from the following detailed description of the presently preferred embodiments thereof, which description should be considered in conjunction with the accompanying drawings in which:

FIG. 1 is a longitudinal view, partly in cross-section, of a typical, prior art, pipe type cable joint with line pipes extending from a joint casing;

FIG. 2 is a fragmentary view similar to FIG. 1 with cable supporting and restricting tubes of the invention around the cable cores;

FIG. 3 is an enlarged, side elevation view, partly in cross-section of one of the supporting and restricting tubes shown in FIG. 2;

FIG. 4 is similar to FIG. 2 and illustrates an alternative form of a supporting and restricting tube;

FIG. 5 is an enlarged, cross-sectional view of a segment of the supporting and restricting tube shown in FIG. 4; and FIG. 6 is an enlarged side elevation view of a portion of an alternative form of the supporting and restricting tube shown in FIG. 4.

FIG. 1 illustrates a joint casing 1 comprising four metal sleeves 2, 3, 4 and 5 secured to each other in fluid-tight relation, such as by welding. The ends of the sleeves 2 and 5 are adapted to the line pipes 8 and 9 by reducers 6 and 7 secured in fluid-tight relation to both the sleeves 2 and 5 and the line pipes 8 and 9, such as by welding. The reducers 6 and 7 form adapters or the casing 1 to line pipes 8 and 9. The reducers 6 and 7 can be considered as end walls for casing 1.

A typical pipe type cable installation comprises three cable cores within each line pipe 8 and 9, with six cable ends in casing 1 four of which, designated by the reference numerals 10, 11, 12 and 13, are visible in FIG. 1. Each cable core has a central conductor surrounded by insulation and may comprise additional components, such as semiconductive layers, shields, skid wires, etc., but the additional components are not material to the invention and have not been illustrated for the sake of simplicity. Usually, the insulation is in the form of wrapped paper tapes impregnated with an insulating oil.

The conductors of the cable cores are conductively joined within the casing 1 in a well-known manner, and the joined conductors are covered by insulation which may be in the form of an insulating sleeve or wrappings of tape. For example, the conductors of the cores 10 and 12 are joined and covered with insulation 14, the conductors of the cores 11 and 13 are joined and covered with insulation 15, etc. The so-joined conductors and covering insulation are supported by spiders 16 and 17, e.g. Y-shaped, metal members, and the cores are firmly bound to the spiders 16 and 17 and to each other by wrappings 18 and 19 of strong, non-metallic tapes. The spiders 16 and 17 rest on the bottom portion of the interior surface of the casing 1. When the cable is in use, the pipes 8 and 9 and the casing are filled with oil or gas under high pressure, e.g. 200 psig.

It will be observed from an examination of FIG. 1 that the internal size of the casing 1 is larger than the cross-sectional size of the cores 10–13 and is larger than a circle tangent to the peripheries of the three joint coverings. Also, it will be noted that the portions of the cables, or cable cores, 12 and 13 within the casing 1 and between the end wall 7 and the points 14b and 15b, where the joint coverings begin, are bent. Similarly, the portions of the cables, or cable cores, 10 and 11 within the casing 1 and between the end wall 6 and the points 14a and 15a are bent. Usually, the bent portions have the shape of an S-curve, and with thermomechanical bending of such portions under load conditions, "soft" spots, leading to electrical failure, can develop. In addition, since the cables, the joints and the spiders are not anchored within the casing 1 with respect to movement axially of the casing 1, the joints can move axially of the casing 1 which can cause the undesirable conditions described hereinbefore.

Thermomechanical bending and associated electrical failures can be eliminated, or significantly reduced, by preventing, or reducing, axial movement of the cable cores, such as the cores 10–13, from the line pipes 8 and 9 into the casing 1. However, any such restriction on the axial movement of the cores should be accomplished without mechanically clamping the cable cores or joints with clamps which apply pressure thereto with subsequent dislocation of the helically applied paper tapes with consequent damage to the electrical properties of the cores.

In accordance with the invention, axial movement of the cores, such as the cores 10–13, from the line pipes 8 and 9 into the casing 1 is prevented, or reduced, by surrounding the portions of the cores within the casing 1 with a tube, which shall be made of non-magnetic material, which has an interior size close to but greater than the cross-sectional size of the cores, such tube being held in a longitudinally curved shape thereby causing such portions of the cores to assume and maintain a similar curved shape. Preferably, the curved shape corresponds to the shape of the letter S, but the curved shape could be a single arc, if lesser restraining forces are permissible, or be helical. The minimum radius of curvature must be at least equal to the minimum bending radius of the enclosed core in order to prevent damage to the core.

The interior size of the tube is greater than the cross-sectional size of the core which is enclosed so that the tube may be slid over the core, when the tube is not made of longitudinally separable parts, and to prevent the application of circumferential clamping pressure to the core by the tube. The maximum interior size for the tube will depend on the length thereof and the size required to obtain the forces necessary for restraining axial movement of the core as will be explained hereinafter. Generally speaking, the internal diameter of the tube will be in the range from 2.5 percent to 20.0 percent greater than the diameter of the core enclosed thereby.

FIGS. 2 and 3 illustrate one form of supporting tube 20 which may be used in accordance with the invention. FIG. 2 illustrates the application of supporting tubes 20 to only the cables or cable cores 12 and 13, but it is to be understood that all portions of all cores within the casing 1 would be similarly enclosed by a supporting tube 20. FIG. 2 shows a plate 21 secured to the disc or end wall 7 in any conventional manner, such as by welding, bolts, etc. The plate 21 has openings 22,23, etc. therethrough for the free passage of the cores, such as the cores 12 and 13.

In the embodiment illustrated in FIGS. 2 and 3, each tube 20 is flexible prior to installation and is made of a non-magnetic material. For example, the tube 20 may be a corrugated, non-magnetic metal tube as illustrated in FIG. 3 or may be a circular cross-section tube of woven, non-magnetic filaments, such as metal filaments. If the tube 20 is a corrugated metal tube of the type illustrated in FIG. 3, preferably, the corrugations are filled with an epoxy resin and covered with an epoxy impregnated tape, as indicated by the reference numeral 24 in FIG. 3, after the tube 20 has been placed over a core and bent into the desired shape, in order to increase the rigidity of the tube 20. The woven filament tube would be treated in a similar manner.

The tube 20 has a pair of end collars 25 and 26 and an intermediate collar 27 secured thereto. The collars 25 and 26 are interconnected by a turnbuckle 28 to hold the section of the tube 20 between the collars 25 and 26, and hence, the portion of the core therewithin, in the arcuate shape shown in FIGS. 2 and 3. The collar 27 and either the collar 26 or the plate 21 are interconnected by a turnbuckle 29 for the same purpose in connection with the portion of the tube 20 between the collars 26 and 27. Of course, the turnbuckles 28 and 29 may also be used, in an obvious manner, to bend the two portions of the tube 20 into arcuate shapes.

The collar 26 on the tube 20 is secured to the plate 21 in any desired manner, such as by welding, bolts, etc. so that the collar 26 cannot move radially or axially in the casing 1. However, the tube 20 preferably is not secured to the casing 1 at another point because such securing of the tube 20 is unnecessary and omission of further securing steps avoids further labor and because limited movement of the tube 20, except at the collar 26, is desirable for thermal and other reasons.

The purpose of the tube 20 is to support the portion of a core therewithin in a bent shape and to resist movement of a core in the direction of the axis thereof as such is aligned within a line pipe 8 or 9. Therefore, the internal size of the tube 20 in relation to the cross-sectional dimension of a core, the radius of curvature of the portions of the tube 20 and the length of the tube 20 are selected in conjunction with the inherent stiffness of a core so that as a core attempts to expand longitudinally, the axial forces are opposed by the compressive and frictional forces acting on the core by reason of the curved shape of the tube 20. It is, of course, well-known that when one attempts to push a relatively rigid, rectilinear member through a curved duct or conduit substantial forces resisting movement of the member through the duct or conduit are encountered, the resisting forces depending on the closeness of the fit between the member and duct or conduit, the radius of curvature of the latter, the length of the duct or conduit and the stiffness of the member.

Accordingly, the dimensions of the tube 20 and the curvature thereof must be determined empirically for any given cable core, and the compressive forces acting on the core must not exceed the compression forces which a cable can withstand without damage, such latter forces being typically in the range from 600 to 1,000 pounds per foot. Examples of embodiments of the tube 20 for a core with a stranded copper conductor 1.6 inches in diameter with oil impregnated, paper tape insulation having an outside diameter of 3.7 inches is as follows:

| | |
|---|---|
| Curvilinear length of tube 20 | 3-5 feet |
| Inside diameter of tube 20 | 3.85 inches |
| Radius of curvature of each curved portion of tube 20 | 24-36 inches |

The use of a tube 20 which is flexible prior to installation of the tube 20 on a cable core has the advantage that the tube 20 may be straight, i.e. have a rectilinear axis, while a core is threaded therethrough. Thus, with the turnbuckles 28 and 29 released, the tube 20 may be straightened and the tube may be easily threaded onto the cores 12 and 13. Thereafter, the turnbuckes 28 and 29 are assembled, and the tube 20 is bent into the curved shape illustrated.

In some cases, force adequate to provide sufficient resistance to movement of a core may be obtained by merely using the bent portion of the tube 20 between the collars 26 and 27, the portion between the collars 25 and 27 being omitted. In such case, it may be necessary to lengthen the portion remaining as compared to the case where both portions are used.

An alternative construction for the supporting tube is illustrated in FIGS. 4-6. The supporting tube 20a illustrated in FIG. 4 comprises a plurality of rigid sections 30 secured together, such as by bolts (not shown) extending through holes 31 (FIG. 5) in flanges 32 and 33 at the ends of a hollow cylindrical body 34. The sections 30 may be made of non-magnetic metal, a synthetic resin or other rigid material which is strong enough to withstand the axial forces applied thereto by the linearly expanding core. The dimensions of a section and the number thereof is selected in the manner described hereinbefore for the selection of dimensions for the tube 20.

Each flange 32 and 33 has a sloping face, respectively, 35 and 36, so that when the sections are assembled the tube 20a has an S-shaped curvature as illustrated in FIG. 4. The angle between the plane of each face 35 and 36 and a plane perpendicular to the axis of the body 34 may, for example, be of the order of 3-6 degrees.

The section 30 nearest the plate 21 may be secured to the plate 21, and the core may be threaded therethrough. Thereafter, the remaining sections may be applied over the core and secured together. Alternatively, if the section 30 nearest the plate 21 is not to be secured to the plate 21 by a method, such as by welding, which would damage the core, all the sections may be applied over the core and then secured as required.

If the cable cores have already been joined, such as in an existing installation, the sections 30 may be formed by two halves meeting along the longitudinal, axial plane of the body 34 indicated by the dotted line 37 in FIG. 5, and after the halves have been applied over a core, they may be held together by conventional means such as clamps, bolts, etc. The flange of the section 30 nearest the end wall 7 may be secured to the end wall 7 or a split end plate, like the plate 21, may be secured to the end wall 7 and the flange of the last-mentioned section 30 may be secured to such plate.

To reduce the cost of a tube 20a, and possibly, to permit the use of parts which need not be specially manufactured, the sections 30 with sloping end faces 35 and 36 may be replaced by sections 30a (FIG. 6) having end faces, the planes of which are perpendicular to the axis of the body 34. The sections 30a may be secured together with tapered, ring spacers, such as the spacer 38, between adjacent flanges, such as the flanges 33a and 32a.

In the embodiments described, the axes of the tubes 20 and 20a lie in a plane, but it will be apparent that the tube 20 may be twisted and the sections 30 and 30a may be assembled so that the axis of the supporting tube 20 or 20a is helical.

Although preferred embodiments of the present invention have been described and illustrated, it will be apparent to those skilled in the art that various modifications may be made without departing from the principles of the invention.

What is claimed is:

1. In an electric cable installation in which a portion of an insulated cable is within a casing having an internal size greater than the cross-sectional size of the cable, whereby the cable may be bent into a curved shape within the casing, support means within said casing for restricting axial movement of said cable, said support means comprising a longitudinally curved tube of an internal size greater than the cross-sectional size of a portion of the cable within said casing enclosing said last-mentioned portion of said cable, said tube having a radius of curvature at least equal to the minimum bending radius of said last-mentioned portion of said cable and the internal size, curvature and length of said tube being sufficient to substantially restrict axial movement of said cable under normal working conditions, and means securing said tube in said casing in a fixed position with respect to movement axially of said cable.

2. Support means as set forth in claim 1 wherein said tube is shaped to correspond to the letter S or portion thereof.

3. Support means as set forth in claim 2 wherein said tube is a flexible tube and further comprising means maintaining said tube in a shape corresponding to the letter S or portion thereof.

4. Support means as set forth in claim 3 wherein said tube is a corrugated tube and further comprising rigid means filling spaces between corrugations at the exterior of said tube.

5. Support means as set forth in claim 3 or 4 wherein said tube is made of non-magnetic material.

6. Support means as set forth in claim 2 wherein said casing has an end wall and wherein an end of said tube is secured to said end wall by said means securing said tube in said casing.

7. Support means as set forth in claim 1 wherein said tube comprises a plurality of hollow, rigid segments secured to each other at adjacent ends thereof, the axis of each segment extending at an angle to the axis of adjacent segments.

8. Support means as set forth in claim 7 wherein each segment has end faces which lie in planes extending at an angle to a plane perpendicular to the axis of the segment.

9. Support means as set forth in claim 7 wherein each segment has end faces which lie in planes perpendicular to the axis of the segment and further comprising a tapered ring between each pair of the segments.

10. Support means as set forth in claim 8 or 9 wherein said tube is shaped to correspond to the letter S or portion thereof.

11. Support means as set forth in claim 8 or 9 wherein each segment comprises two halves abutting along a plane extending longitudinally of the segment.

12. In an electric cable installation as set forth in claim 1 wherein the conductor of said cable is joined to the conductor of another cable within said casing, wherein the joint between the conductors is surrounded by insulation having a length less than the length of said casing, wherein said casing has an end wall and wherein said tube extends from said end wall to adjacent said insulation.

13. In an electric cable installation as set forth in claim 12 wherein a further tube as set forth in claim 1 encloses a portion of said another cable within said casing.

* * * * *